Patented Apr. 23, 1929.

1,710,481

UNITED STATES PATENT OFFICE.

HARRY HEXAMER KELLER, OF VENTNOR, NEW JERSEY.

REENFORCED RUBBER AND METHOD OF MAKING IT.

No Drawing.   Application filed March 31, 1927. Serial No. 180,077.

My invention relates to plastic compositions of the flexible type and more particularly to rubber compounds.

Principal objects are to provide for reenforcing and bonding rubber whereby it is possessed of greatly increased tensile strength and wearing qualities which extend its sphere of usefulness in the arts and render it especially desirable under conditions involving the essentials of flexibility, resistance to wear, and traction, as, for example, floor coverings or pavements, whether tiled or otherwise, tire treads, belted pulleys, soles and heels.

The nature of the invention consists in the method and product of the method whereby vulcanizable rubber or a vulcanized rubber compound has incorporated or diffused therein a finely divided base material for the purpose and with the result of insuring density combined with marked tensile strength, stability, increased resistance to abrasion, and a greater coefficient of friction.

The reenforcing base material is by preference aluminum oxid or silicide of carbon in a finely divided state, that is to say a state of fineness manifested by a particle size of 180 mesh to as finely pulverulent form as it is possible to produce.

A typical rubber compound according to my invention might embody 100 parts by weight of a good grade of rubber, for example, plantation standard smoked sheets or equivalent, 3 parts of sulphur, 26.5 parts of zinc oxid, 26 parts of either aluminum oxid or silicide of carbon and 1 part of diphenylguanidine or its equivalent of any other type of accelerator, the proportions varying according to circumstances and the type of service the particular art demands.

In the practice of the invention, crude rubber is reduced to a state of plasticity in any appropriate manner, for example, in the usual way by subjecting it to the action of heated rolls. When the plastic is of the consistency of bread dough the other ingredients are added and the mixing continued until the mass is in a homogeneous plastic state. The mixing is accomplished preferably under environment conditions making for desirable mastication. The ease with which the base material, finely divided aluminum oxid or silicide of carbon or their equivalent, is wetted by the rubber, plus the large surface contact which is the direct result of the fineness of the particle size, readily makes for proper diffusion.

The warm homogeneous plastic material is now ready for shaping which, obviously, will vary according to the ultimate service for which it is intended. For example, it may be pressed or moulded, or it may be rolled into sheets preparatory to calendaring or tubing, whereupon it is vulcanized.

I have discovered that rubber plastic as a matrix is greatly reenforced by the diffusion therein, in a finely divided state, of one or the other of the base materials recited, the smaller the particle size the greater the reenforcing property; the reenforced plastic being characterized by its density, stability, tensile strength, resistance to abrasive wear, and exceptional tractive surface properties, the new product being possessed of definite non-skid properties which operate to break the moisture film on a smooth roadway or walk.

Having described my invention, I claim:

1. A method of treating rubber to increase its tensile strength and wearing qualities, consisting in reducing crude rubber to a state of plasticity approaching that of bread dough and adding thereto aluminum oxid, sulphur, zinc oxid and an accelerator, and mixing the mass to a homogeneous plastic state, the aluminum oxid being in a state of extreme fine division to provide a large surface contact which, when wetted by the rubber, provides proper diffusion of the aluminum oxid through the mass.

2. A vulcanizable plastic consisting of 100 parts of rubber, 3 parts of sulphur, 26.5 parts of zinc oxid, and 26 parts of aluminum oxid in extreme fine division, together with an appropriate quantity of an accelerator.

In testimony whereof I affix my signature.

HARRY HEXAMER KELLER.